(12) United States Patent
Kuo et al.

(10) Patent No.: US 6,668,672 B2
(45) Date of Patent: Dec. 30, 2003

(54) BALL SCREW NUT (75) Inventors: Chang-Hsin Kuo, Taichung (TW); Huang-Ming Lin, Taichung (TW); Paul Yang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 09/940,890

(22) Filed: Aug. 29, 2001

(65) Prior Publication Data
US 2002/0028122 A1 Mar. 7, 2002

(30) Foreign Application Priority Data
Sep. 1, 2000 (TW) .................................. 89215236 U (51) Int. Cl.[7] .................................................. F16H 1/18
(52) U.S. Cl. ................................. 74/424.82; 74/424.87
(58) Field of Search ................... 74/459, 424.8 A, 74/424.8 R, 89.15, 424.86, 424.87, 424.82

(56) References Cited

U.S. PATENT DOCUMENTS

| | | | | |
|---|---|---|---|---|
| 3,638,507 A | * | 2/1972 | Orner | 74/89.42 |
| 3,731,553 A | * | 5/1973 | Nilsson | 74/424.71 |
| 4,074,587 A | * | 2/1978 | Brusaco | 74/424.82 |
| 4,148,226 A | * | 4/1979 | Benton | 74/424.87 |
| 4,638,548 A | * | 1/1987 | Miller | 29/558 |
| 4,745,975 A | * | 5/1988 | Price | 166/250.01 |
| 4,896,552 A | * | 1/1990 | Virga | 74/89.42 |
| 4,945,781 A | * | 8/1990 | Isert | 74/424.94 |
| 5,303,607 A | * | 4/1994 | Katahira | 74/424.87 |
| 5,555,770 A | * | 9/1996 | Dolata et al. | 74/424.86 |
| 5,560,251 A | * | 10/1996 | Babinski | 74/424.86 |
| 5,622,082 A | * | 4/1997 | Machelski | 74/424.86 |
| 5,662,082 A | * | 9/1997 | Black et al. | 123/254 |
| 5,749,690 A | * | 5/1998 | Kutz | 411/431 |
| 5,906,136 A | * | 5/1999 | Yabe et al. | 277/562 |
| 5,937,700 A | * | 8/1999 | Brown et al. | 74/424.86 |
| 6,023,991 A | * | 2/2000 | Yabe et al. | 74/89.44 |
| 6,081,067 A | * | 6/2000 | Ocsovai et al. | 313/318.01 |
| 6,149,364 A | * | 11/2000 | Maeda | 411/432 |

* cited by examiner

Primary Examiner—David A. Bucci
Assistant Examiner—Julie K. Smith
(74) Attorney, Agent, or Firm—Rosenberg, Klein & Lee (57) ABSTRACT

Ball screw nut is composed of an inner threaded nipple and an outer housing. The nipple is constructed with a hollow hard tubular metallic material to ensure the strength of the structure; while the outer housing where requires less strength is formed of a plastic material by ejection mold process so as to reduce the production cost and simplify the fabrication process. The nipple and the housing are conjoined together by screw engagement.

6 Claims, 8 Drawing Sheets

BALL SCREW NUT

BACKGROUND OF THE INVENTION

1. Field of the Invention

The present invention relates to ball screw nut, in particular, to a ball screw nut whose inner part is made of metallic material, while outer part is covered with plastic material.

2. Description of the Prior Art

The ball screw is a mechanical device which has been in use for a long time. A conventional ball screw is essentially composed of a screw bolt, a ball screw nut, and a plurality of rolling balls. The outer surface of the screw bolt is formed into a plurality of spiral grooves, whereas the ball screw nut has a hollow nut body and other structural part for the balls to circulate along. There is a plurality of spiral grooves formed in the inner surface of the nut body coupled with the spiral grooves of the screw bolt to form a pathway for those balls, thus the balls circulate along this pathway formed of the two parts of spiral grooves thereby the relative motion between the screw bolt and nut is carried out with reduced friction. It is well understood that a conventional screw bolt and nut unit is wholly made of metallic material which requires an intricate production process and heat treatment, in addition, fabrication of the associated accessories for a screw bolt and nut unit is also somewhat tricky. As a result, using a screw bolt and nut unit as transmission means is considered to be an expensive measure therefore discouraging wide application in industry.

SUMMARY OF THE INVENTION

Aiming at the above depicted problems, the essential object of the present invention is to simplify fabrication process of the screw bolt and nut unit so as to minimize the production cost of the same thereby widening the application field of the screw bolt and nut in industry.

After having carried out a long time research and experimentation, the present inventor came to a conclusion that using metallic material by means of ordinary mechanical process in fabricating the entire ball screw nut will be resulted in a high production cost.

However, there is a problem that the contact between rolling balls and the spiral grooves formed in the screw bolt and nut unit is nearly a point contact made by a spheric steel ball and an inner curved surface of the spiral groove pathway where almost all portion of the loading force of the unit is exerted. In this situation, a metallic material or another equivalently hard material should be employed to fabricate the inner portion of the nut of the screw bolt and nut without compromising.

In the meanwhile, the outer portion, i.e. housing of the ball screw nut is released from a heavy loading force. Accordingly, in the present invention, this part of the ball screw nut is constructed of a plastic material by ejection mold process so as to simplify the fabrication process and lower the production cost.

To enable a further understanding of the innovative and technological content of the invention herein, refer to the detailed description of the invention and the accompanying brief description of the drawings appended below.

DETAILED DESCRIPTION OF THE PREFERRED EMBODIMENT

Figure 1:
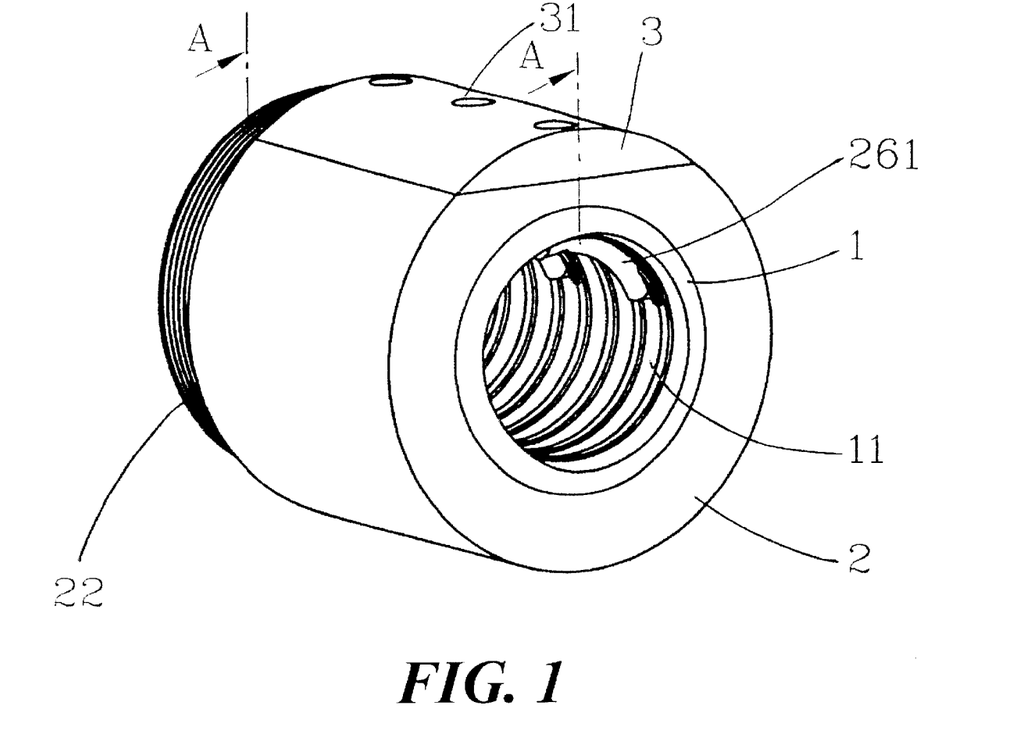
FIG. 1 is a three dimensional view of the ball screw nut a first embodiment of the present invention.

Referring to FIG. 1, a three dimensional view of the ball screw nut in a first embodiment of the present invention is shown. The ball screw nut comprises a screw threaded nipple 1 constructed of a metal and a housing 2 made of a plastic material. The nipple 1 is hollow with plurality of spiral grooves 11 formed on the inner surface thereof, for a plurality of balls to roll along. A housing 2 is enclosing the screw threaded nipple 1 directly by means of plastic ejection mold process, supersonic binding, or direct adhesion using a binder therebetween. In order to enhance binding effect, the outer surface of nipple 1 can be made uneven by forming a plurality of grains (not shown). According to FIG. 1, a cover plate 3 equipped with several containment holes 31 are tightened on the housing 2 by screw engaging through the containment holes 31. After finishing assembly of the ball screw nut, a ball interrupter 261 is installed near the spiral groove 11 of the nipple 1 for hindering the balls to keep rolling around the spiral groove 11.

Figure 2:
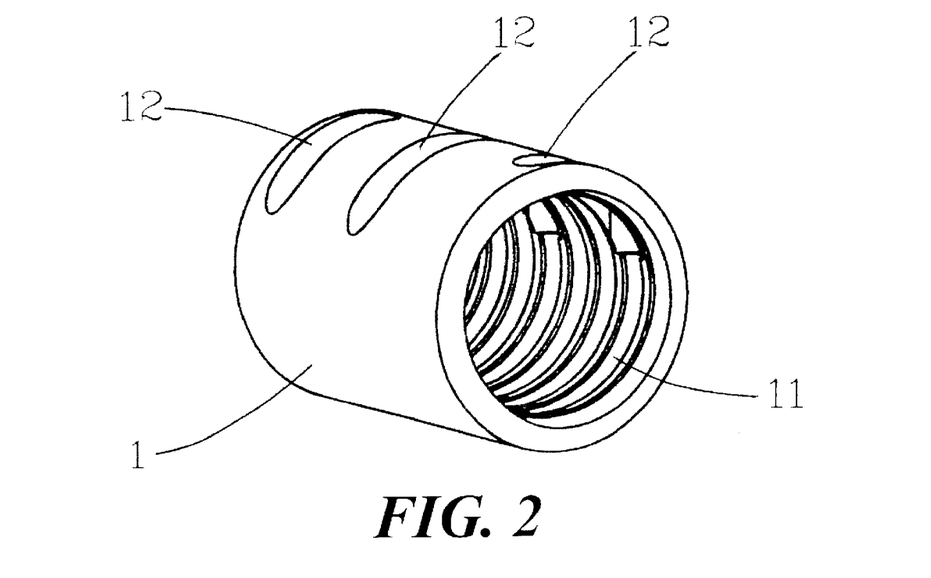
FIG. 2 is a three dimensional view of the screw threaded nipple in FIG. 1.
Figure 3:
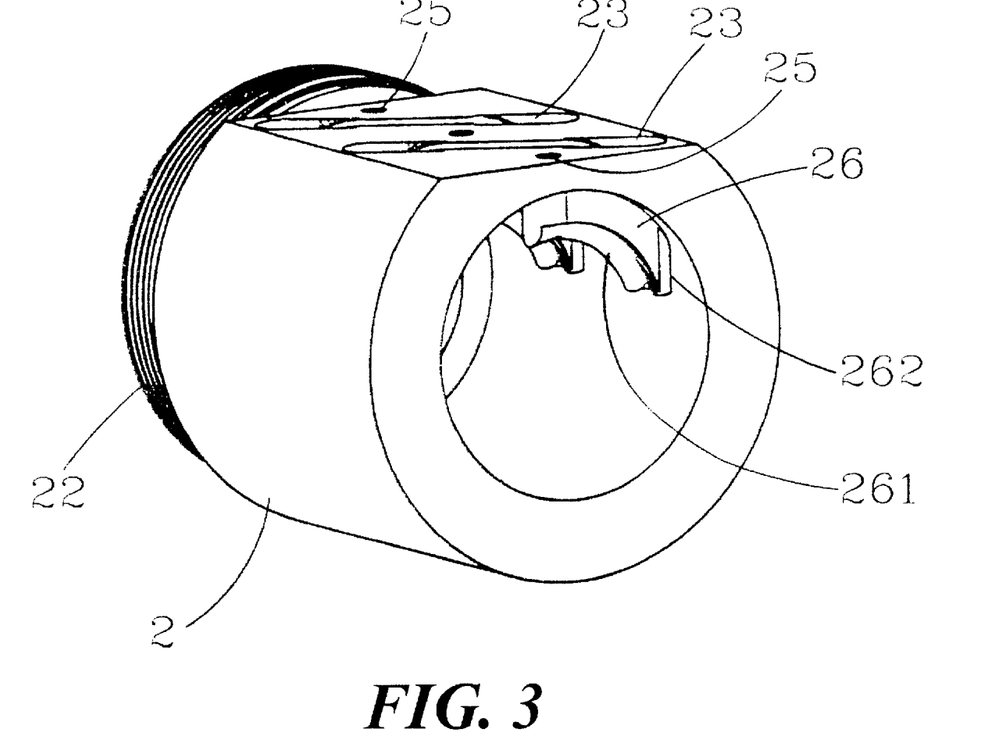
FIG. 3 is a three dimensional view of the housing in FIG. 1.

For illustrating the embodiment more understandable, reference should be made to FIG. 2 which shows the three dimensional view of the screw threaded nipple 1 in FIG. 1, and FIG. 3 which shows the three dimensional view of the housing 2 in FIG. 1. As clearly shown in FIG. 2, several elongated asylum slots 12 parallel to the direction of the spiral grooves 11 are formed on the nipple 1 without interfering the function of the spiral grooves 11 in ball circulation region. As shown in FIG. 3, an extension member 26 is formed at the position on the housing 2 corresponding to position of each asylum slot 12 for blocking in the asylum slot 12 after the housing 2 and the nipple 1 is bound together. The ball interrupter 261 is emerged out of the surface of the spiral groove 11 so as to prohibit the balls to pass through, on the other hand, a ball guide plate 262 is provided for directing the balls to leave the spiral groove 11 and move along in a direction induced by the ball guide plate 262. A circulation groove 23 connected to the ball guide plate 262 between two adjacent extension members 26 is formed on the housing 2 for providing a pathway for the balls to circulate from one spiral groove 11 to the adjacent one according to induction of the ball guide plate 262. Several screw holes 25 are bored on the housing 2 for screw engaging the cover plate 3 onto the housing 2.

Figure 4:
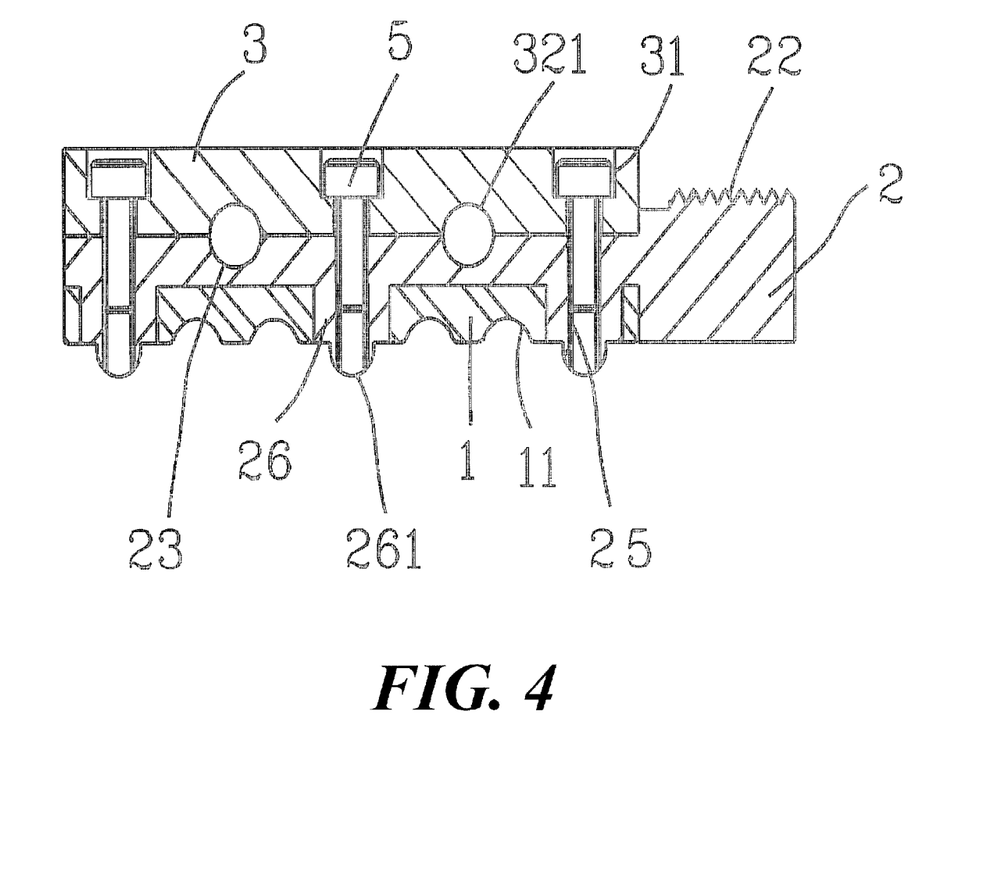
FIG. 4 is a fragmentary cross sectional view cut along line A—A of FIG. 1.

FIG. 4 shows a fragmentary cross sectional view cut along line A—A of FIG. 1. As it is shown in FIG. 4 in greater detail, the cover plate 3 is tightened to the housing 2 with screws 5 engaging the screw holes 25 through containment holes 31. With this structure, a ball guide surface 321 of the cover plate 3 and the spiral groove 23 of the housing 2 are coupled together to form a pathway having an analogously circular cross section for balls. As the screw holes 25 are just aligned to respective extension members 26, the screws 5 are able to fix the cover plate 3 onto the housing 2 with a strong binding force by means of their effective increased number of threads notwithstanding the housing being made of plastic.

Figure 5:
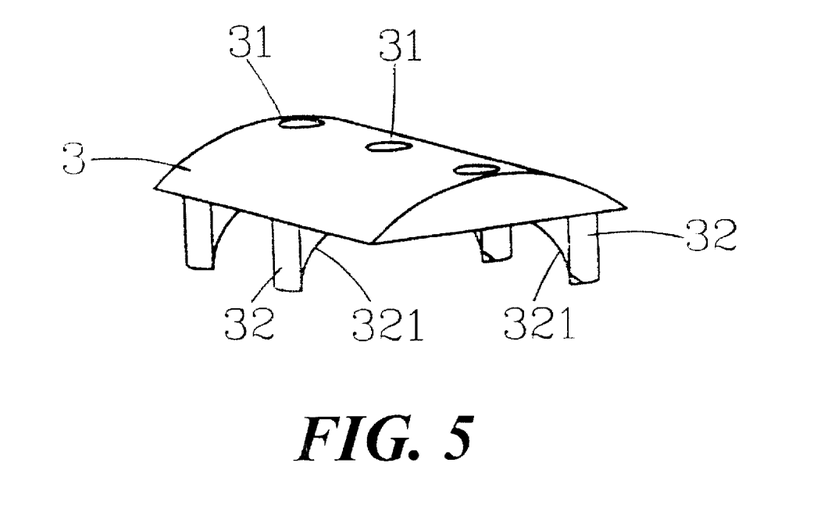
FIG. 5 is a three dimensional view of the circulation cover plat in FIG. 1.

FIG. 5 shows a three dimensional view of the circulation cover plate 3 in FIG. 1, a plurality of protruded blocks 32 each having an aforementioned arcuate ball guide surface 321 are formed beneath the cover plate 3 for guiding the balls to circulate along. After the cover plate 3 is fitted to the housing 2, the protruded block 32 is blocked in the circulation groove 23 of the housing 2, while the ball guide surface 321 and the circulation groove 23 of the housing 2 are coupled to form a ball circulation pathway as mentioned above.

Figure 6:
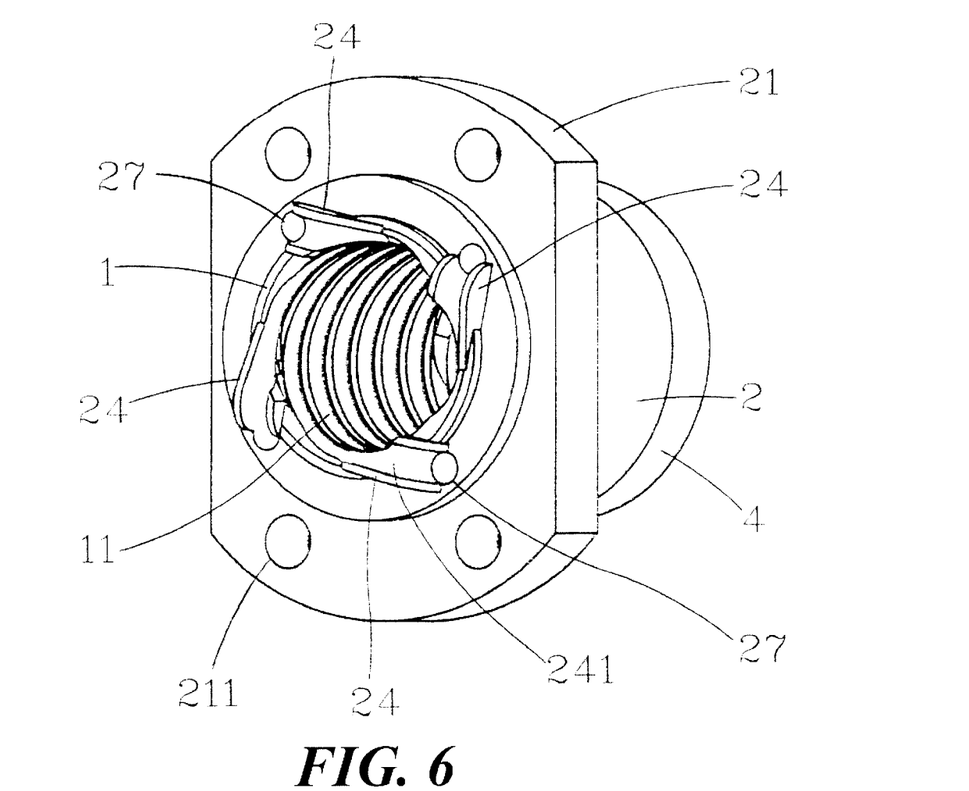
FIG. 6 is a three dimensional view of the ball screw nut in a second embodiment of the present invention.

FIG. 6 is a three dimensional view in a second embodiment of the present invention. In this embodiment, two end surfaces of the nipple 1 are used for circulation of the balls. Inner side of the ball screw nut is the screw threaded nipple 1 made of a metallic material, while the housing 2 formed of a plastic material is fixed to the nipple 1. In the drawing the housing 2 has a flange 21 with several containment holes 211 for conjoining the ball screw nut to other structural members. The both sides of the housing 2 are covered with end caps 4. For illustrating the relative positional relationship between the housing 2 and the nipple 1, the left side end cap is excluded in the drawing of FIG. 6. It can be observed in FIG. 6 that there are several protruded block 24 formed on the end surface of the housing 2, circulation groove 241 is formed on each protruded block 24 for ball circulation, further to this, a circulation hole 27 is provided abut on each circulation groove 241 for balls to turn around. The balls in the spiral groove 11 can reach the other end surface 4 of the housing 2 by way of the circulation groove 241 on the protruded block 24 and the circulation hole 27.

Figure 7:
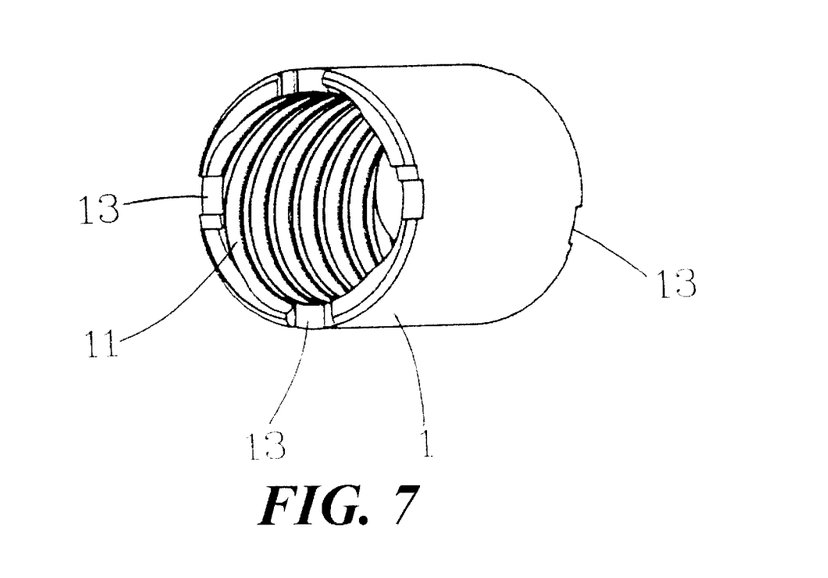
FIG. 7 is three dimensional view of the screw threaded nipple in FIG. 6.
Figure 8:
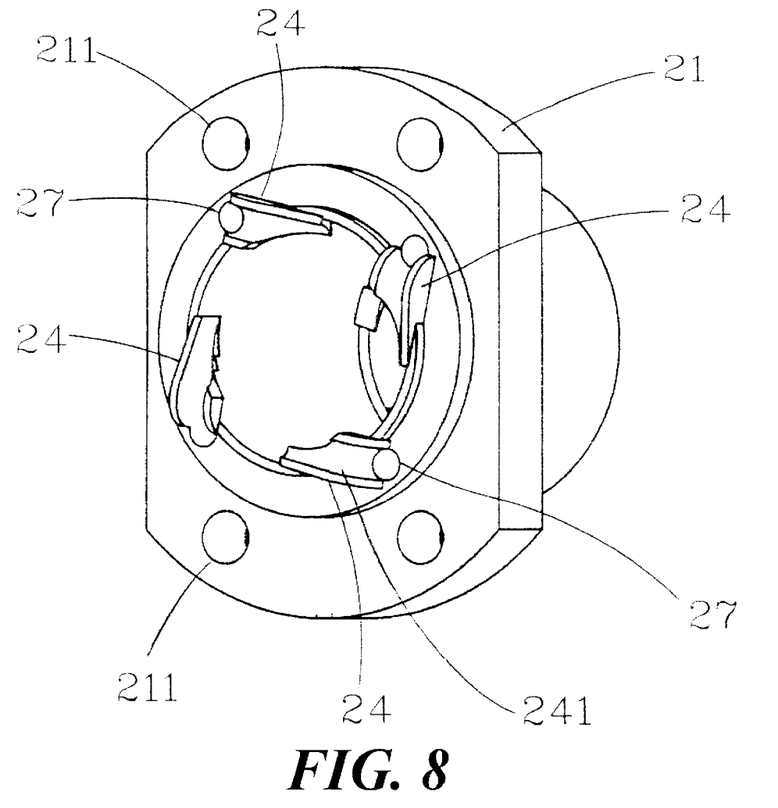
FIG. 8 is a three dimensional view of the housing in FIG. 6.

Referring to FIG. 7, a three dimensional view of the screw threaded nipple 1 of FIG. 6 and FIG. 8 (a three dimensional view of the housing 2 in FIG. 6) is shown. Several notches 13 are formed at both sides of the nipple 1 on the end surfaces of the nipple 1 for saving occupied space of the balls. Where the total length of a b all screw nut is not of significant concern, the notches may be omitted so as to reduce production costs.

Figure 9:
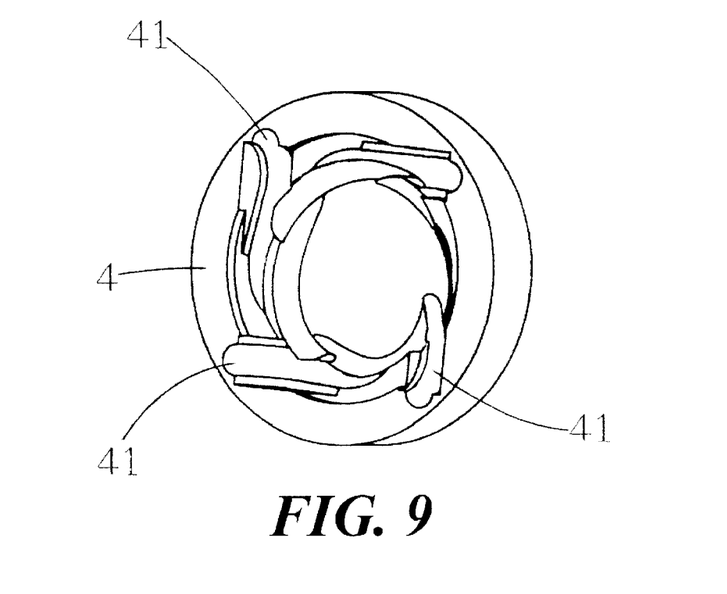
FIG. 9 is a three dimensional view of the end cap in FIG. 6.

FIG. 9 shows a three dimensional view of the end cap 4 shown in FIG. 6. As shown in FIG. 9, several guide grooves 41 are formed on the end cap 4. In assembling the end cap 4 to the housing 2, the surface where guide grooves 41 are formed is attached to the end surface of the housing 2 such that the guide grooves 41 and the circulation grooves 241 are coupled together to form a path way for ball circulation.

Figure 10:
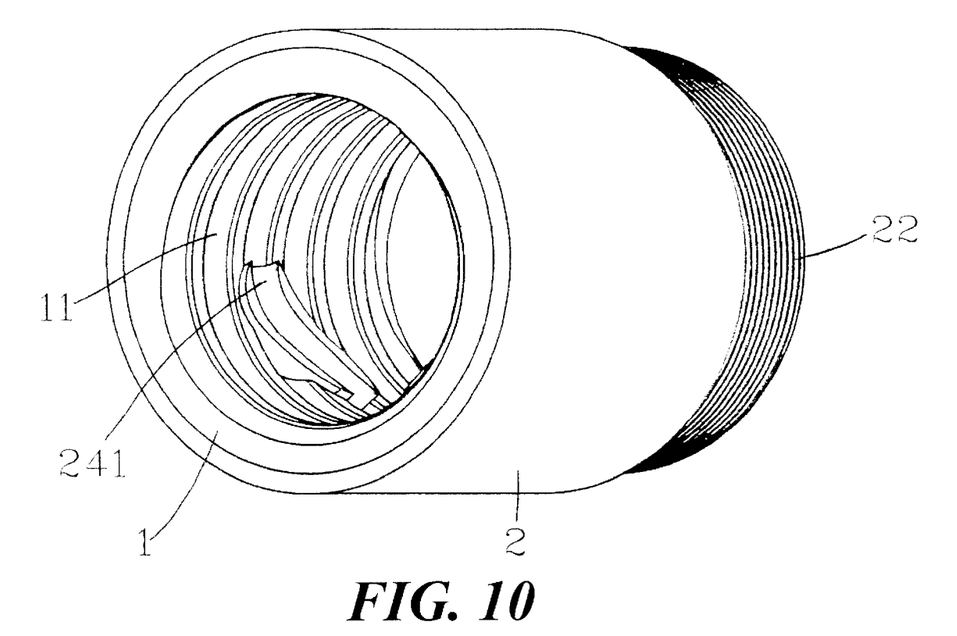
FIG. 10 is a three dimensional view of the ball screw nut in a third embodiment of the present invention.

FIG. 10 is a three dimensional view in a third embodiment of the present invention. In this embodiment, the circulation groove 241 is used to circulate the balls from one spiral groove 11 to another adjacent one. At the inner part of the ball screw nut is the screw threaded nipple 1 made of a metallic material, while at the outer part thereof is the housing 2 formed of plastic. The housing 2 is firmly engaged to the nipple 1.

Figure 11:
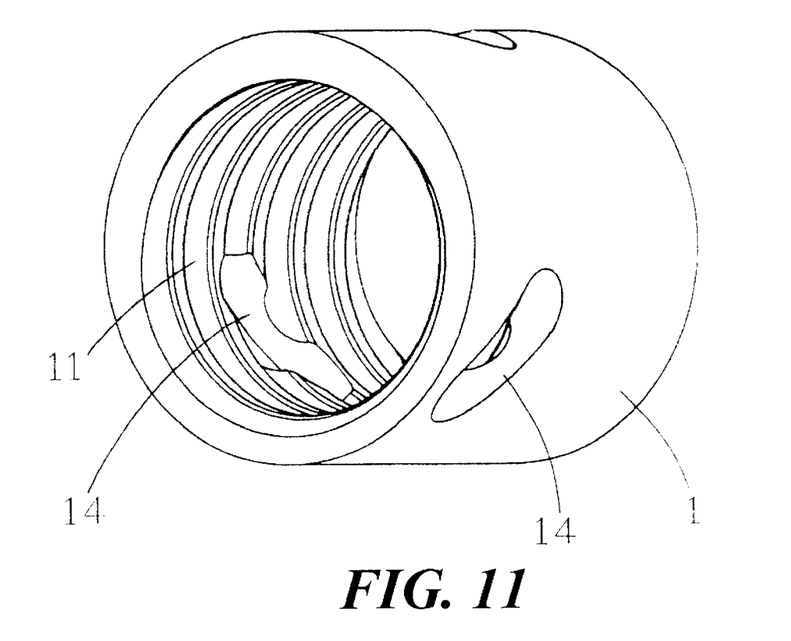
FIG. 11 is a three dimensional view of the screw threaded nipple in FIG. 10.
Figure 12:
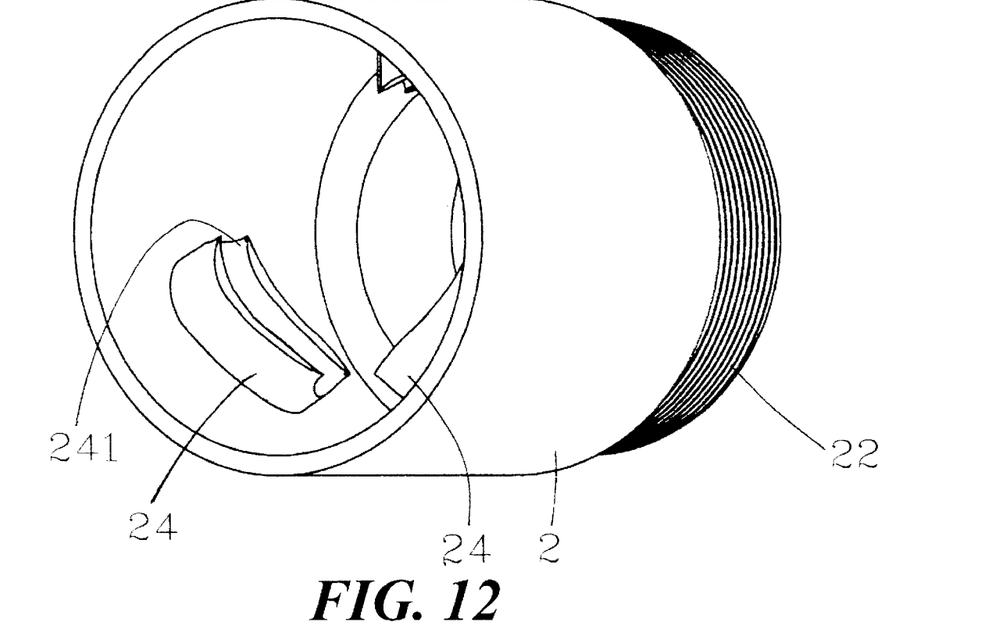
FIG. 12 is a three dimensional view of the housing in FIG. 10.

For fuller understanding the structural design about the nipple 1 and the housing 2 in the embodiment, reference should be made to both FIG. 11, a three dimensional view of the nipple 1 in FIG. 10, and FIG. 12, a three dimensional view of the housing 2 in FIG. 10. As shown in FIG. 11, several circulation holes 14 straddling the two adjacent spiral grooves 11 are formed on the nipple 1 for the balls to circulate from one spiral groove 11 to the adjacent one by way of the circulation groove 241 (see FIG. 10) in the circulation hole 14. The protruded block 24 equipped with the circulation groove 241 whose width is slightly greater than the diameter of a ball is formed in the housing 2 so that the balls are able to circulate by way of circulation groove 241. The protruded blocks is an integral part of the housing 2 formed of the same material as that of the housing 2.

Figure 13:
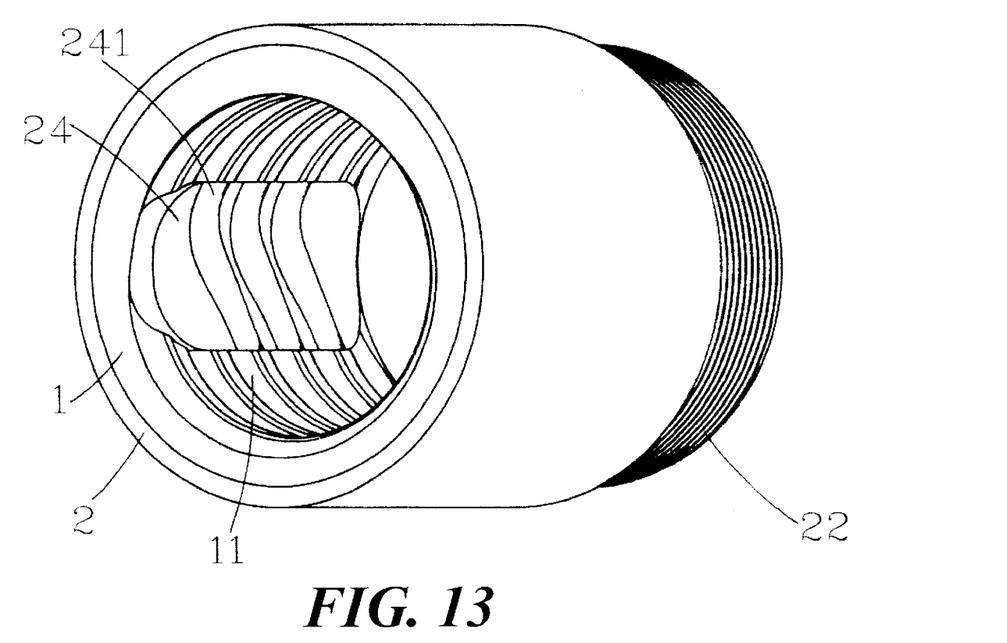
FIG. 13 is a three dimensional view of the ball screw nut in a fourth embodiment of the present invention.

FIG. 13 is a three dimensional view in a fourth embodiment of the present invention. In this embodiment, the protruded block 24 on the spiral groove 11 is employed for the balls to circulate from one spiral groove 11 to the adjacent one. Each protruded block has more than one circulation grooves 241. Similar to the previous embodiments, the inner side of the ball screw nut is the screw threaded nipple 1 made of the metallic material, while the outer side thereof is the housing 2 formed of plastic, the housing 2 is firmly engaged onto the nipple 1.

Figure 14:
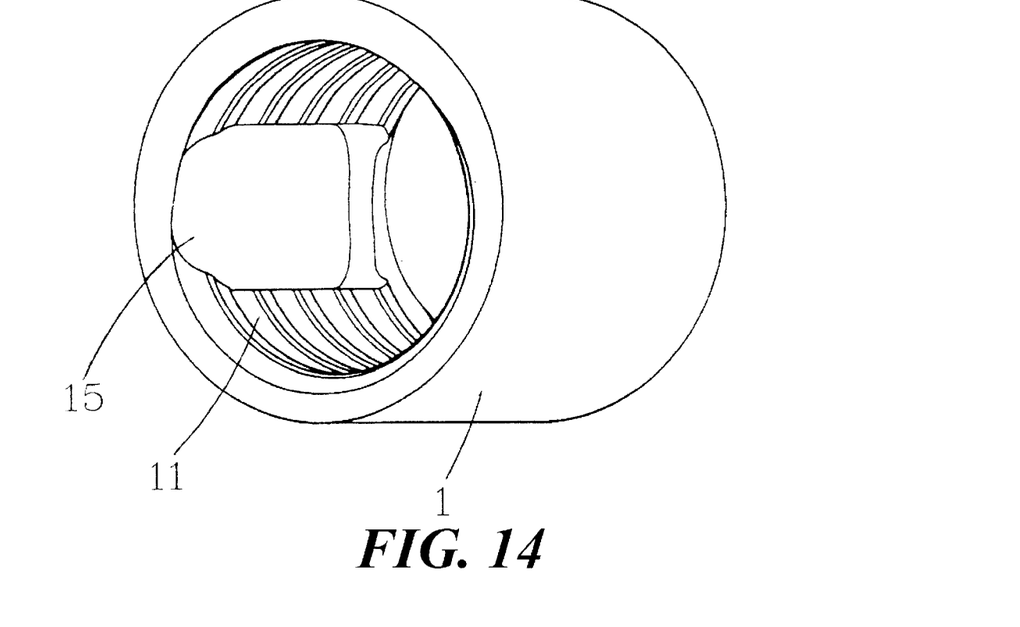
FIG. 14 is a three dimensional view of the screw threaded nipple in FIG. 13.
Figure 15:
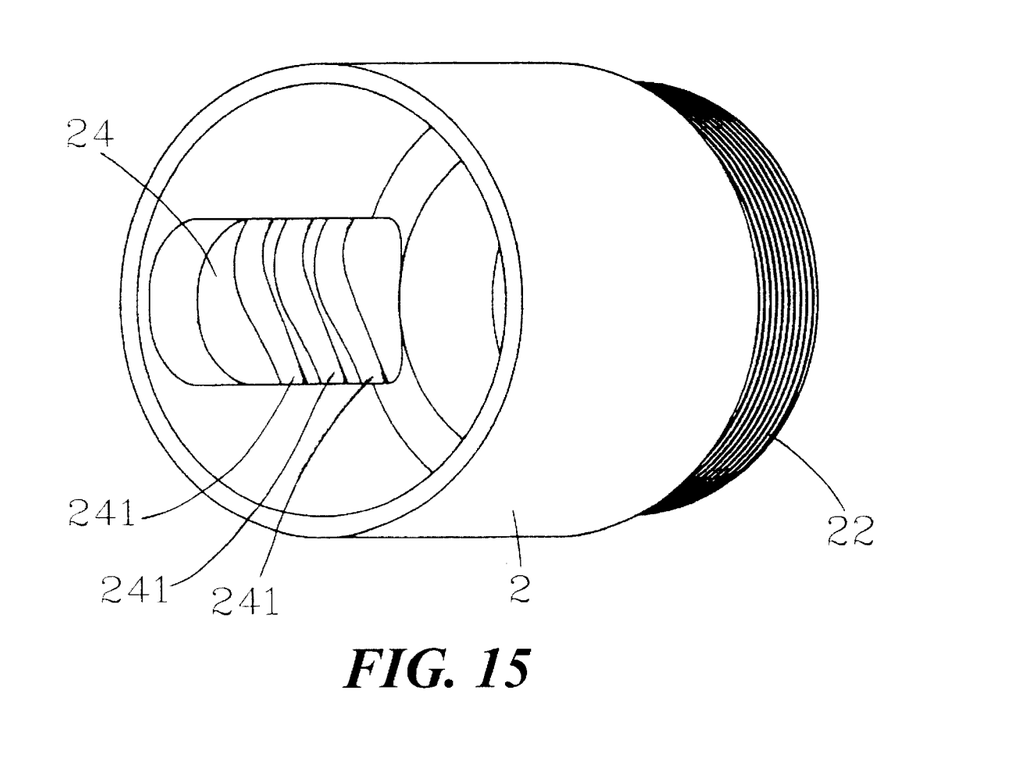
FIG. 15 is a three dimensional view of the housing in FIG. 13.

For fuller understanding the structural design about the nipple 1 and the housing 2 in this embodiment, reference should be made to both FIG. 14, a three dimensional view of the nipple 1 in FIG. 13, and FIG. 15, the three dimensional view of the housing 2 in FIG. 13, A long elongated hole 15 (see FIG. 14) approximately laid parallel to longitudinal axis of the ball screw nut and encompassed several several loops of spiral grooves 11 is formed on the nipple 1 and the protruded block 24 having several loops of circulation grooves 241 is formed inside the housing 2 at a position corresponding to the elongated hole 15 for the balls to circulate form one spiral groove 11 to the adjacent one by way of the circulation grooves 241 of protruded block 24. The protruded block 24 is an integral part of the housing 2 formed of the same material.

It emerges from the description of the above embodiments that the invention has several noteworthy advantages, in particular, the inner hollow screw threaded nipple can be easily constructed with a hard tubular metallic material to ensure the strength of the structure, on the other hand, the outer housing where requires less strength is formed of a plastic material by plastic ejection mold process so as to reduce the production cost and simplify the fabrication process.

Other embodiments of the present invention will become obvious to those skilled in the art in light of above disclosure. It is of course also understood that the scope of the present invention is not to be determined by the foregoing description, but only by the following claims.

What is claimed is:

1. A ball screw nut comprising:

a hollow screw threaded nipple made of a metallic material having a plurality of spiral grooves at the inner surface for a plurality of rolling balls to roll along therein, a plurality of asylum slots parallel to said spiral grooves being formed on said screw threaded nipple; and, a housing formed of a plastic material enclosing around said screw threaded nipple, said housing and said screw threaded nipple being firmly engaged with each other;

a plurality of extension members being formed on said housing, said extension members extending into said asylum slots.

2. Ball screw nut of claim 1, wherein each said extension member is equipped with a ball interrupter.

3. Ball screw nut of claim 1, wherein several circulation grooves are formed on the outer surface of said housing.

4. Ball screw nut of claim 3, wherein the width of said circulation grooves is slightly greater than said rolling balls.

5. Ball screw nut of claim 1, wherein outer surface of said housing is covered with a cover plate.

6. Ball screw nut of claim 5, wherein said cover plate is formed of a plastic material by ejection mold process.

* * * * *